United States Patent [19]

Foerster et al.

[11] Patent Number: 4,473,850
[45] Date of Patent: Sep. 25, 1984

[54] METHOD AND APPARATUS FOR RECORDING DIGITALLY CODED TELEVISION SIGNALS

[75] Inventors: Hubert Foerster, Darmstadt; Josef Sochor, Dieburg; Reinhard Kutzner, Darmstadt; Richard Heinz, Pfungstadt, all of Fed. Rep. of Germany

[73] Assignee: Robert Bosch GmbH, Stuttgart, Fed. Rep. of Germany

[21] Appl. No.: 287,693

[22] Filed: Jul. 28, 1981

[30] Foreign Application Priority Data

Aug. 8, 1980 [DE] Fed. Rep. of Germany ........ 3029983

[51] Int. Cl.³ .............................................. H04N 5/92
[52] U.S. Cl. .................................... 360/9.1; 360/19.1; 360/33.1; 360/38.1; 360/32; 358/343
[58] Field of Search ...................... 360/38.1, 33.1, 32, 360/9.1, 8, 19.1, 75, 84, 47, 48; 358/335, 314, 336, 343; 371/68

[56] References Cited

U.S. PATENT DOCUMENTS 4,303,950 12/1981 Toniguchi ......................... 360/19.1
4,330,795 5/1982 Foerster ............................... 360/75
4,353,098 10/1982 Heinz .................................. 360/19.1

FOREIGN PATENT DOCUMENTS 2935574 3/1981 Fed. Rep. of Germany ........ 360/75

OTHER PUBLICATIONS

"Digital Audio Recording on Videotape: Some Choices" by Bixsby, SMPTE Journal, Jul. 1980, vol. 89, pp. 508-512; Presented 2/2/80 at SMPTE Conference.

Primary Examiner—Alan Faber
Attorney, Agent, or Firm—Frishauf, Holtz, Goodman & Woodward

[57] ABSTRACT

Digitalized audio signals of a plurality of channels are stored blockwise in each channel and then recorded blockwise in repeating channel sequence in similarly situated portions of successive oblique tracks in which are also recorded concurrent video signals, but the recording of a channel block is skipped once per picture field, so that an integral number of channel sequences will record all the audio channel information for a period equal to a picture field. In the video track where audio recording is skipped, other information may be recorded. The read-out rate of the channel blocks is slightly accelerated so that the track skipping loses no information. Consequently, the recorded signals can be cut in, or cut off, or edited at any frame end without loss of registry of the audio channels.

23 Claims, 9 Drawing Figures

METHOD AND APPARATUS FOR RECORDING DIGITALLY CODED TELEVISION SIGNALS

This invention concerns the storage of digital television signals on a recording medium such as a magnetic tape, with the video information and the audio information being alternately recorded, where it is necessary for the recording of a complete television frame to turn the head wheel of the recorder by an amount that is not an integral number of revolutions. The audio information is recorded in a plurality of channels in blocks on location with different track sections at each location.

Cross reference is made to U.S. patent application Ser. No. 149,948, filed May 15, 1980 (Heinz and Kutzner) now U.S. Pat. No. 4,353,098, owned by the assignee of the present application. In that earlier application a method of recording digital color television signals was disclosed in which the sound signal belonging to the color video was stored on the magnetic tape in essentially the same manner as the video signal. The audio information was for this purpose recorded in alternation with the recording of video information. That proposed method has the advantage that circuit arrangements for error detection, suppression and avoidance can be designed practically in common for picture and sound information. It is stated as a further special advantage that the recorded sound information can be edited by means of electronic padding or otherwise processed in some way while maintaining accurate registry with the picture. According to an illustrated example there described the recording of the audio information is performed in blocks at the end of a track, actually after the recording of the video information.

In another prior patent application of the same assignee, German patent application No. P 29 35 574, and likewise in U.S. Pat. No. 4,330,795, a method of recording television signals was disclosed in which an information carrier in the form of a tape is disposed for operating with a common rotary pickup carrier on which magnetic heads were moved past the tape and the rotary device was driven at a speed which did not have an integral turns number ratio to the picture frame frequency. This system has the advantage that the tape surface available for the storage of the video information can be fully utilized, because the picture line beginnings of every track, with reference to the tape edge, have the same position. In the recording of 25 lines of a television picture on each track a head wheel with two electro-magnetic pickup heads on its periphery must perform twelve and a half revolutions for recording a complete television frame of 625 lines, while the recording of a television picture with the number of 525 lines that is normal in the United States, can be performed during ten and a half head wheel revolutions.

In the actual embodiments of a tape equipment for recording digitally coded color television signals with simultaneous use of both methods of the above-mentioned earlier patent applications, it has been necessary according to the current technical practice to subdivide the incoming audio information bits into at least two separate bit streams and also to record these streams separately. The head wheel of the magnetic tape equipment is therefore provided with four magnetic heads on its periphery in order to avoid intolerably high speeds of revolution, and from these heads alternately half the quantity of information of the nominal number of lines in a track is written in or read out.

In general there is an increasing necessity, in magnetic tape equipment for recording television signals with studio quality, to record two or more sound channels with the picture. Thus it can for example be desired to record the original sound in stereo simultaneously with the picture content and to record a commentary in an additional language and, separately therefrom, the musical accompaniment. Even when the last named tone signals are to be monaurally recorded, there is a necessity of having available, all together, four sound channels of equal quality. In the case of recording of the audio information in blocks at the end of each track following the video information on a magnetic tape equipment with four magnetic heads on the circumference of the rotating head wheel, it is practical to record the individual sound channels in alternating sequence. As a result of the allocation of a number of revolutions that is not an integral number for the storing of a picture frame, there is an undesired shift of the sound information at each transition from one picture to the next.

With ten and a half or twelve and a half head wheel revolutions for each recorded full picture frame, a particular coordination of picture and sound information recurs only after two full picture frames. This leads to difficulties for accurately picture-related sequences of individual television scenes, particularly in connection with sound cutting.

The recording of the audio information in blocks at corresponding positions of successive tracks of which the remainder of the track length is occupied by video signals inherently involvves time compression (bit rate acceleration) before recording, and time expansion (bit rate slowing) at some stage after pickup.

SUMMARY OF THE INVENTION

Briefly, the problem of keeping the sound signal more fully in step with the video signal is solved by a slight additional time compression of the sound signal in recording so as to enable the sound signal to be recorded in blocks of such duration that there is an integral number of block sequences per complete picture frame. This has the advantage of providing a simple correspondence of sound channel to picture channel portions. In consequence, cutting to fit broadcast time, or for editing, always finds the digitally coded sound signals in "lip synchronism." The making of copies of television recordings is also made secure against loss of sound track synchronism even with several generations of copies. This provides an incidental feature of the invention consisting in the provision of "skipped" intervals in each frame which are free of sound signals that can be used for additional information or for special codes to insure proper operation of the recording and reproduction system. Various refinements and details of particular ways of implementing the feature of the invention are illustrated in the detailed description below, by way of example.

THE DRAWINGS

The detailed description that follows makes reference to the annexed drawings representing illustrative examples. In the drawings.

DESCRIPTION OF THE ILLUSTRATED METHODS AND EMBODIMENTS

Figure 1:
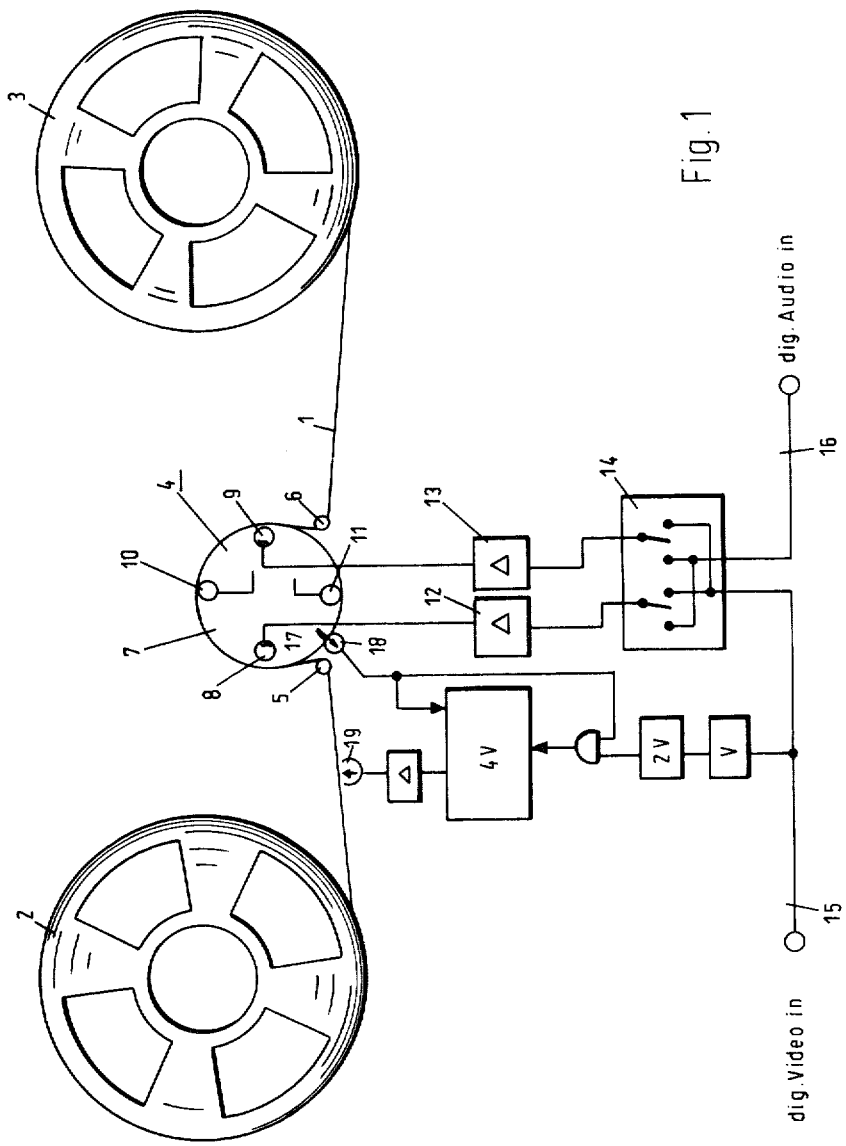
FIG. 1 is a highly schematic diagram of magnetic tape equipment for explanation of the necessary units of such an equipment.

The units of the magnetic tape equipment that are not necessary for the explanation of the invention have been left out on the highly schematized diagram of FIG. 1. Tape 1 having a magnetizable layer moves from a supply reel 2 to a takeup reel 3 and in passing from one to the other it passes in contact with the signal transfer device 4. Guide rollers or studs 5,6 before and after the signal transfer device 4 guide the tape 1 in such a way around the signal transfer device that the center angle of the encircling portion of the tape is about 210°. At the same time, by a corresponding arrangement of the guide rollers 5 and 6 a height offset of the tape is produced by its path about the signal transfer device 4. In a ring-gap of the signal transfer device 4 there is concentrically mounted a head wheel 7 having four electromagnetic transducers (magnetic heads) 8, 9, 10, and 11 arranged around its periphery. The turning of the head wheel in operation of the equipment and the longitudinal movement of the magnetic tape 1 on its way around the signal transfer device 4 causes the magnetic heads to record or reproduce signals (FIG. 1 illustrates recording) on the tape in accordance with the track diagram illustrated in FIG. 2.

The magnetic heads 8, 9, 10, and 11 are individually connectable to the signal processing apparatus for the digitally coded video signals and for the digitally coded sound signals. For simplification of the diagramatic representation these connections are shown only in magnetic heads 8 and 9. From the heads 8 and 9 conductors respectively lead to the amplifiers 12 and 13. These amplifiers can be, in the case of recording of signals on the tape, driver amplifiers and, in the case of reproduction of signals from the tape, reproducing pre-amplifiers. From amplifiers 12 and 13 conductors respectively lead to a switchover device 14 by which the magnetic heads 8 and 9 are switched as needed to the signal line 15 (digitally coded picture signals) or 16 (digitally coded sound signals). The switchover device 14 is shown in FIG. 1 as a mechanical double pole transfer switch, but in practice controllable semi-conductor devices are used for this purpose.

At the periphery of the head wheel 7 a permanent magnet 17 is provided that cooperates with a magnetic transducer 18 set in a fixed location. In recording 4 V synchronism pulses are generated by conversion and processing from the vertical synchronism data addresses of the incoming digital video signals and are recorded by the transducer 19 on a longitudinal track (control track) of the magnetic tape 1. In reproduction the head wheel pulses produced in transducer 18 by the permanent magnet 17 as a result of the rotation of the head wheel 7 serve to synchronize the head wheel with the 4 V synchronism pulses picked up from tape 1 by mans of the transducer 19 and they serve also for controlling the switchover device 14 in accordance with the recording pattern.

Figure 2:
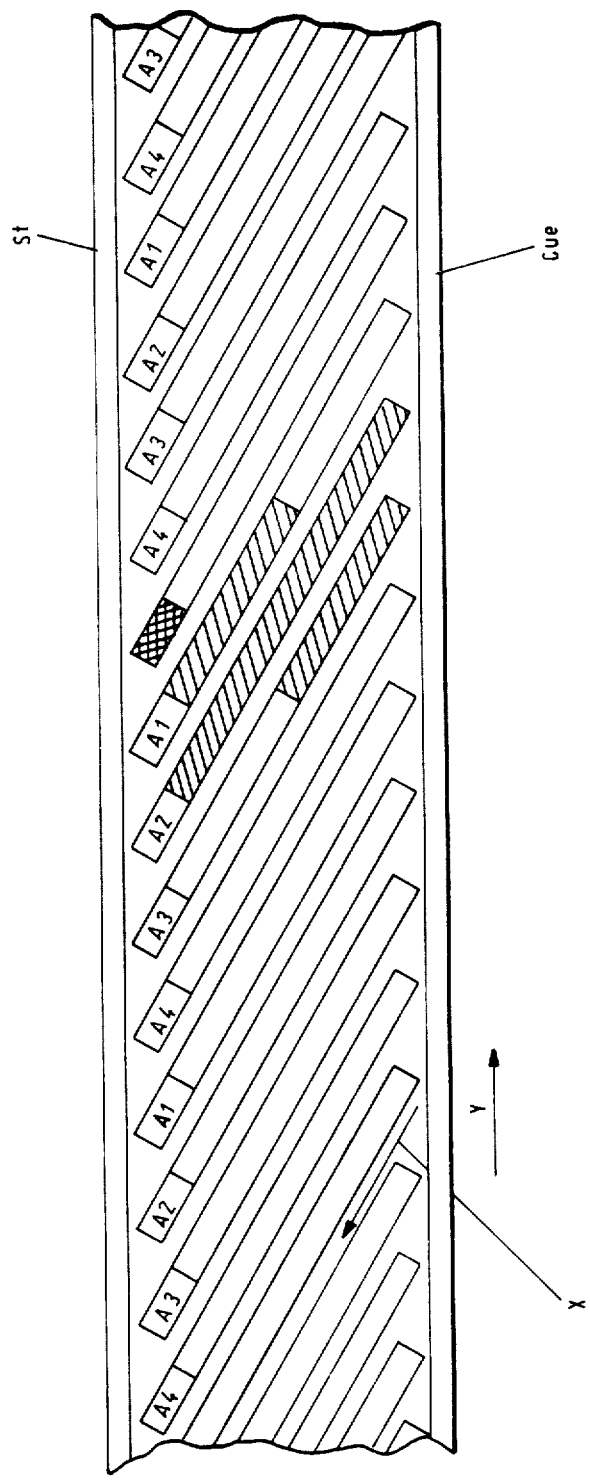
FIG. 2 is a diagram of oblique recording tracks on a tape recorded in accordance with the invention on an apparatus of the general type illustrated in FIG. 1.

FIG. 2 shows a section of the magnetic tape used for recording with the various kinds of tracks represented thereon. In the space between the two longitudinal tracks St and Cue, there extend diagonally to the tape edge the video tracks recorded by the magnetic heads 8, 9, 10, and 11 (FIG. 1). The magnetic heads stroke the tape in the direction of the arrow X while the tape moves in the direction of the arrow y. The light or open portions of the diagonal tracks represent the portions with video information content, while the unidirectionally shaded sections cover the picture synchronization interval. The track sections with picture content each adjoin a region with sound information, with the exception of one track within each section of tape that corresponds to a recorded picture field, a field being a part, usually half, of a frame. The track regions with audio information are designated A1, A2, A3, and A4 according to four assumed sound channels, while the region that is free of sound information at the end of one track per field is designated by cross-hatching.

Figure 3:
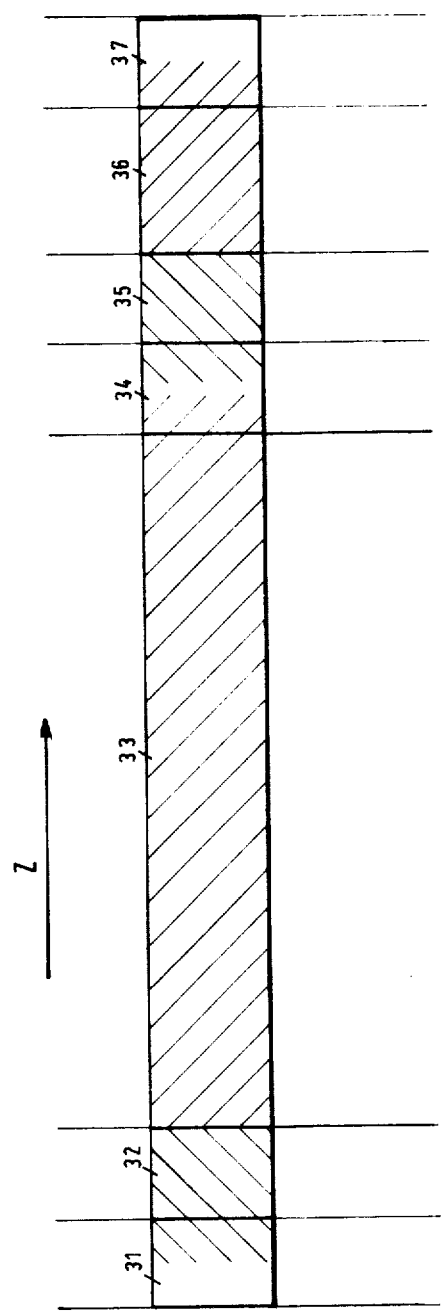
FIG. 3 is a time and track diagram of a recording interval selected from FIG. 2.

FIG. 3 shows on an enlarged scale one of the track sections extending diagonally across the tape and bearing video information and then also audio information. The direction of movement of the corresponding magnet head is indicated by the direction of the arrow Z. The complete track described by the magnetic head is composed of several sections. A first section 31 serves for the mechanical stabilization of the motion relations between magnet head and magnetic tape, and is consequently essentially free of recording. A second section 32 serves for synchronization, for example in the reproduction of recorded information. The data content of a number of video lines is located in the section 33, recorded in accordance with the principles already described. There follows a separation interval 34 in which the switchover of the switch 14 of FIG. 1 takes place. In the following synchronization region 35 for the audio information there can be provided again the synchronization with the receiving circuits for the audio information recorded in region 36. Finally, in section 37 the recording or reproduction circuits are disconnected from the magnetic head, in preparation for the next track which will be stroked by another head.

Figure 4:
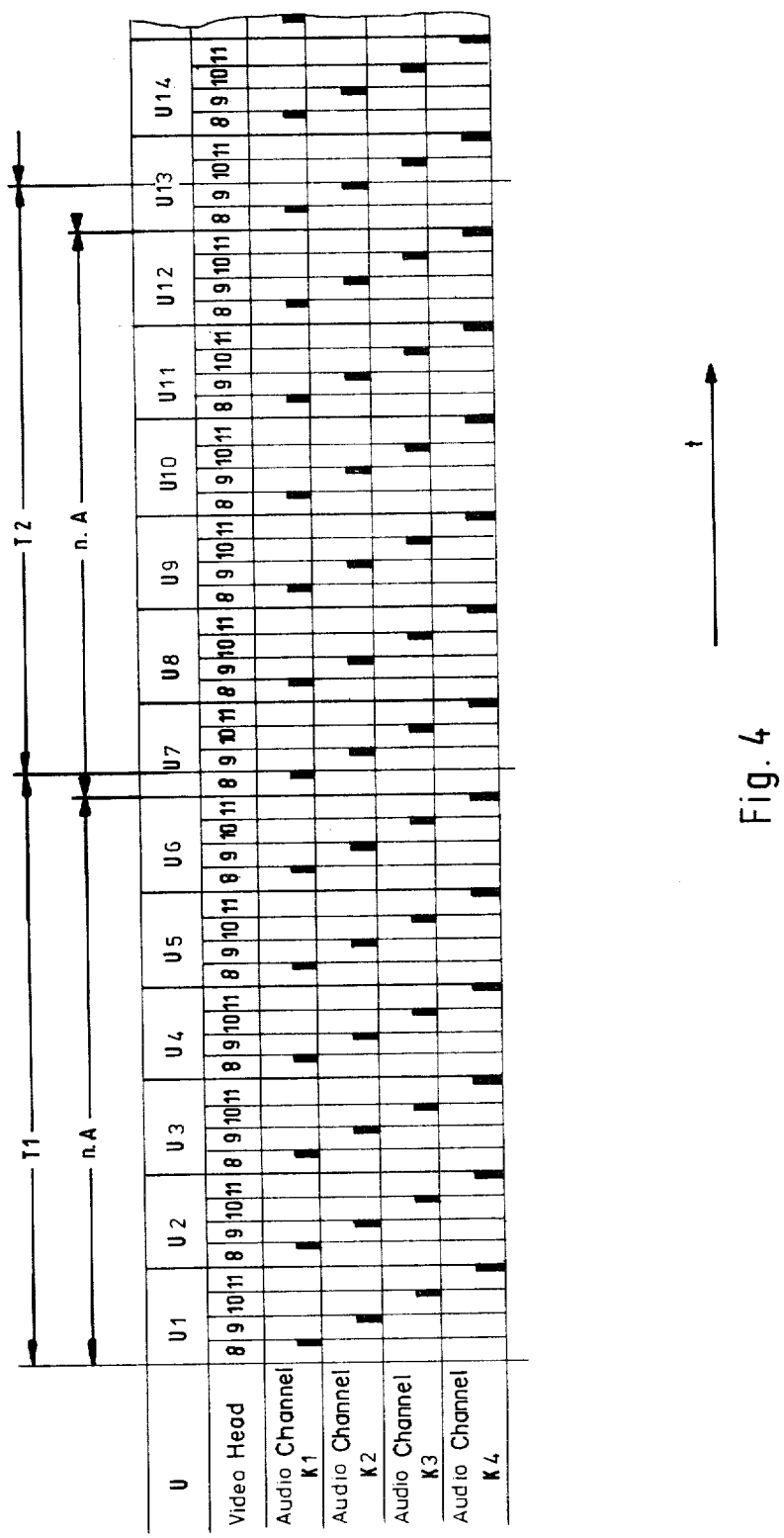
FIG. 4 is a time diagram the pattern in which digitally coded television signals are recorded in a now conventional system.

In FIG. 4 there is shown the time organization of the individual sound channels with respect to the recorded television fields. A field interval is designated T and the individual ones T1, T2, and so on. In the illustrated example a complete television frame consisting of two fields T1 and T2 is recorded or reproduced in the course of 12½ head wheel revolutions U. In the sequential recording of four sound channels K1, K2, K3, and K4 by means of the four respective magnetic heads 8, 9, 10, and 11 on the periphery of the head wheel a sound sequence is completed in every case after a full revolution of the head wheel. Otherwise expressed, the sound channel K1 is always recorded by the magnetic head 8, the sound channel K2 by the magnetic head 9, the sound channel K3 by the magnetic head 10, and the sound channel K4 by the magnetic head 11. As a result of the fact that the recording of a full picture frame requires 12 (full) and one half head wheel revolutions there is produced a shifting of the end of the sound recording with respect to the end of the video recording in the course of a picture frame that is not restored to the original disposition until two picture frames have elapsed.

Figure 5:
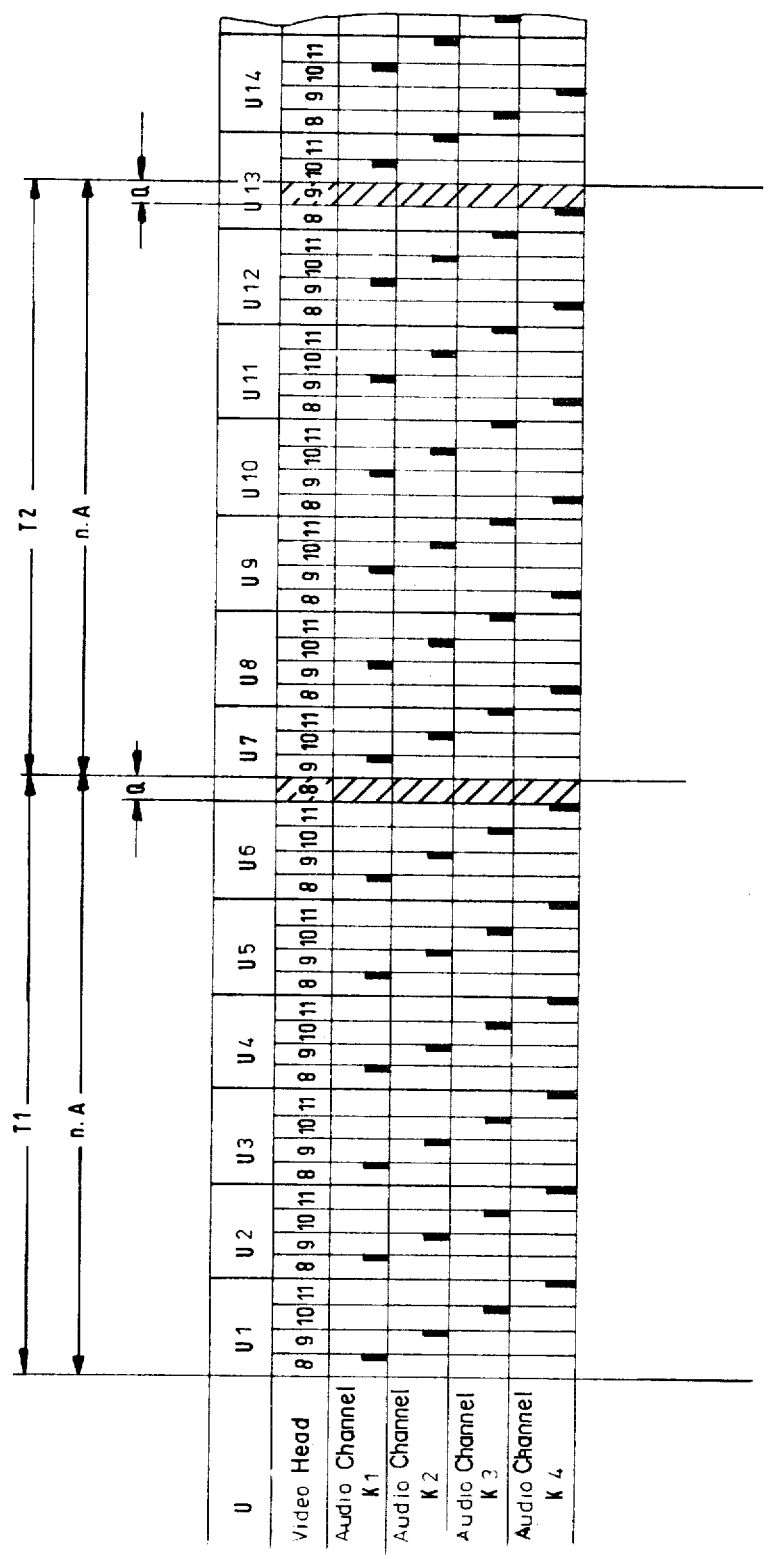
FIG. 5 is a time diagram corresponding to FIG. 4 relating to recording in accordance with the invention.

By the insertion of a recording-free interval in place of the sound recording at the end every television field this shift between picture and sound is removed. One such recording scheme in accordance with the invention is shown in FIG. 5. The recording of a picture frame requires, again, 12½ head wheel revolutions of which 6¼ head wheel revolutions U relate to one field T1 or T2. After six head wheel revolutions the sound signal sequence relating to one field is completed, but still the head wheel must perform ¼ revolution more for the recording of the last lines of the picture field. The magnetic head 8 at the beginning of the seventh head wheel revolution indeed records the video content, but the recording of a sound channel is omitted at the beginning of this seventh head wheel revolution. In consequence, after 6¼ head wheel revolutions have elapsed, both the content of a picture field T1 as well as an integral number of sound channel sequences K1 to K4 have been completed without discrepancy. After 6¼ head wheel revolutions the recording of the second picture field T2 is then begun by the magnetic head 9 as well as the recording of the first sound channel K1 by the same magnetic head. At the end of the second picture field after all told 12½ head wheel revolutions the recording of a picture frame is concluded. The recording of a sound interval is omitted so that the count of the sound channel sequences is again a positive whole number without excess. The intervals Q are shown shaded in FIG. 5.

Figure 6:
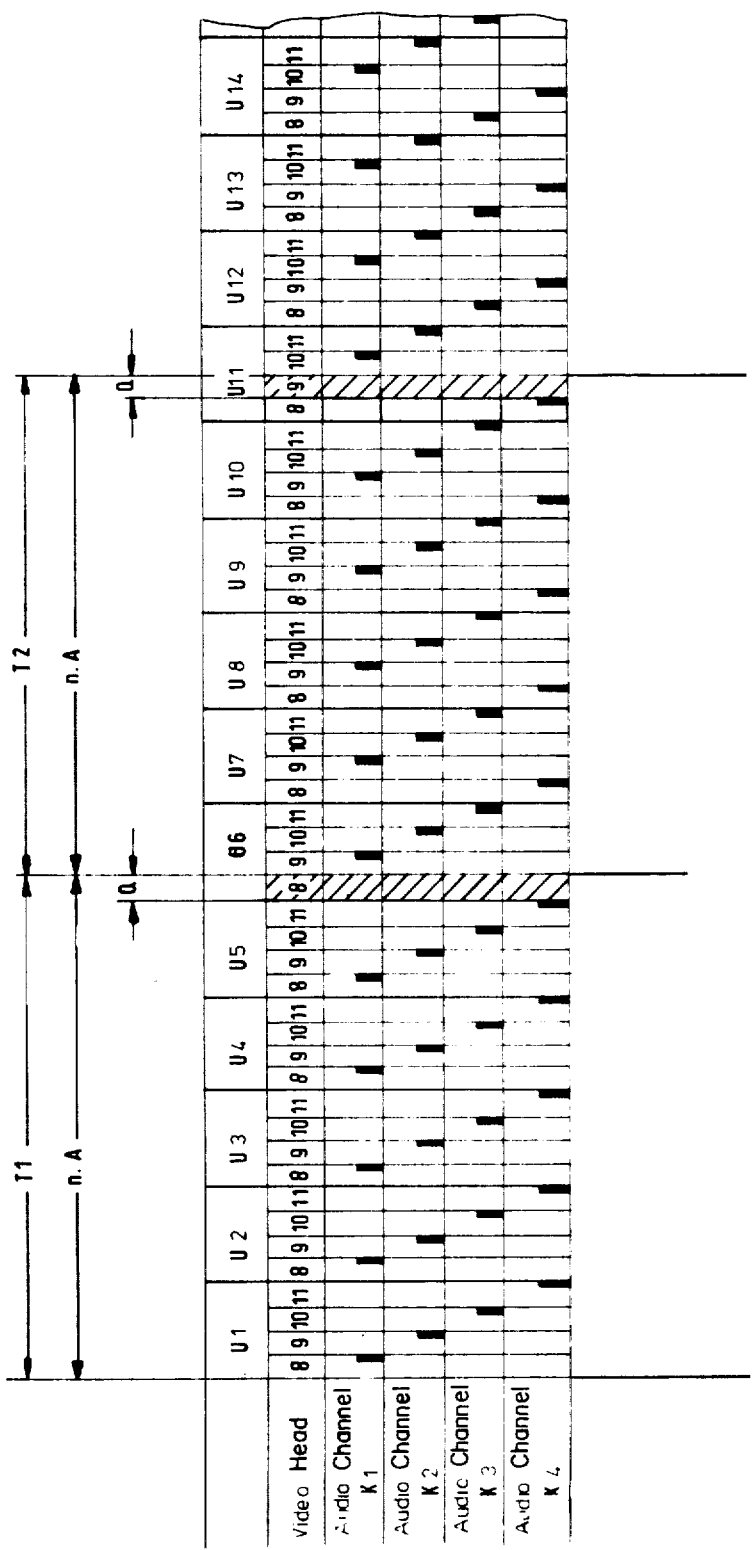
FIG. 6 is a time diagram similar to FIG. 5 relating to a different manner of recording according to the invention.

FIG. 6 shows the recording scheme according to the invention for a 525 line television picture system. The recording of a picture field is in this case concluded after 5¼ head wheel revolutions and a picture frame therefore after 10½ head wheel revolutions. In a manner analogous to FIG. 5, after 5 complete head wheel revolutions an integral number of sound channel sequences is completed, while for the recording of the last lines of the first picture field T1 the head wheel must still carry out ¼ of a revolution, so that the magnet head still transfers the picture content.

The sound channel K1 which in itself belongs to this track section is however not recorded, but shifted enough in time for it to be recorded during the following ¼ head wheel revolution by the magnetic head 9. Since this is at the same time the beginning of a new television field T2, at the end of 10½ revolutions and repetition of a sound recording-free interval Q the recording of a picture frame and of an integral number of sound channel sequences are over. A continuously changing shift between picture and sound content no longer takes place, so that even with picture cutting within a full frame a disturbance-free series arrangement of the sound sequences is secured. The sound-recording-free interval Q can if desired be occupied with other information, for example cutting or administrative information.

Figure 7:
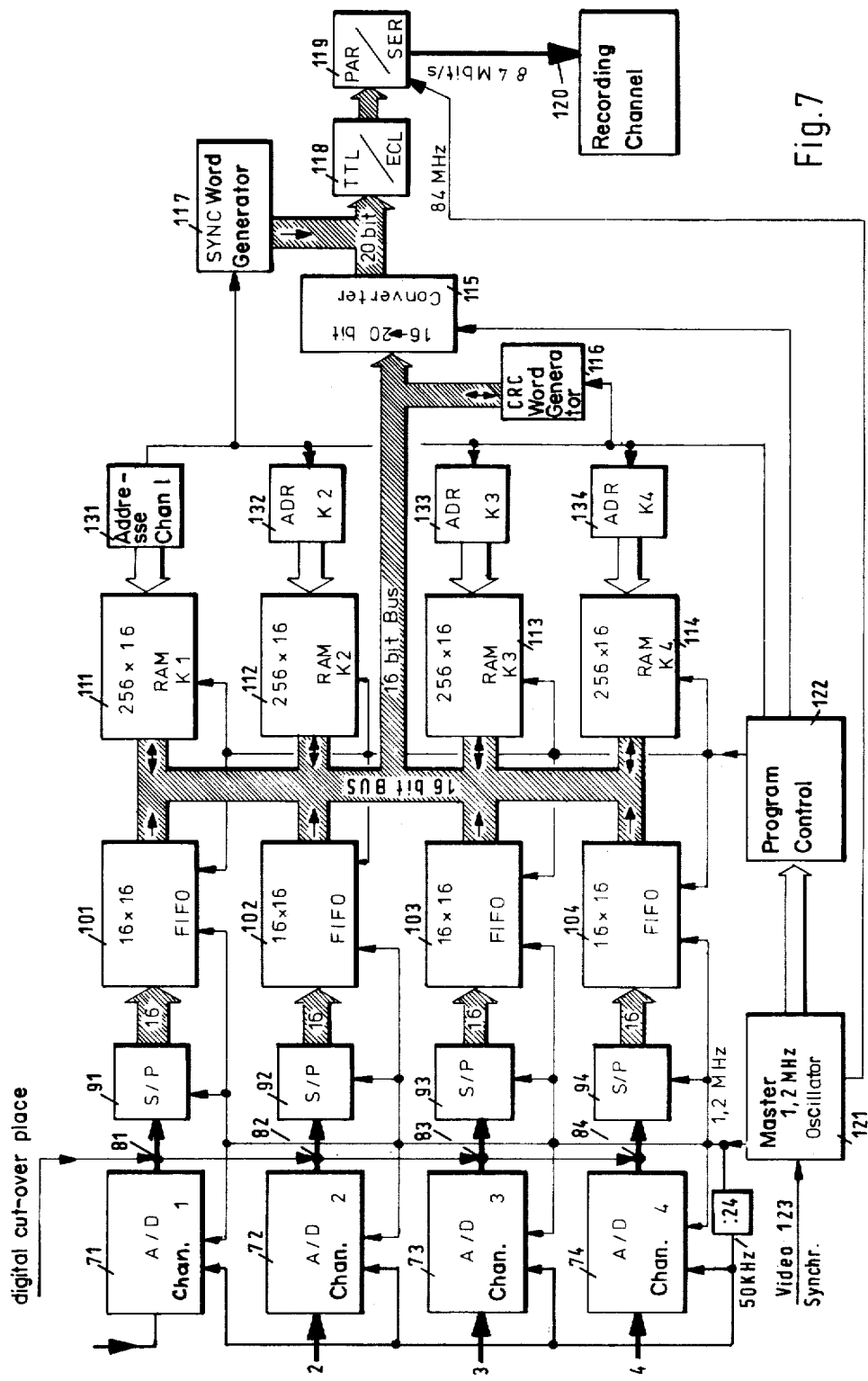
FIG. 7 is a circuit diagram in block form of an apparatus for recording digitally coded television signals.

In the recording circuit shown in FIG. 7 the analogue input of the channels 1, 2, 3, and 4 is connected for each channel in the same way to one of the analogue-to-digital converters 71, 72, 73, and 74. The latter convert the analogue input signal into a series of digital sample values which they provide serially and their respective outputs. At the output of each analogue-to-digital converter is a switch, these being designated 81, 82, 83, and 84, that is represented merely by a dot. At this place the digital cut-over lines are connected where the input signals for a digital input are serially fed in. From the output for each analogue-to-digital converter the signal is led further to a corresponding one of the serial to parallel converters 91, 92, 93, and 94. These have the function of forming parallel word signals from the serial signals. For this reason a 16-bit bus proceeds from the output of the serial-parallel converters to the respective first-in-first-out buffer stores 101, 102, 103, and 104, designated FIFO. These stores have the function to store all incoming signals and to read them out at any desired read-out rate that may be different from the read-in rate. They accordingly represent storage devices that can provide time buffering. At the output of these FIFOs the 16-bit bus continues on to 256×16 oriented random excess memories (RAM) 111, 112, 113, and 114. These RAMs are connected in parallels so that all FIFOs at the output side and all RAMs for the channels 1 to 4 are connected by a common 16-bit bus. Since the reading-out from the FIFOs is offset in time for all channels, the information is in each case transferred only into a RAM, with the reading into the RAMs being controlled in time by a special clock circuit that is contained in the program control 122. The outputs of the FIFOs are connected not only with the data-inputs of the RAMs but are also extended over the 16-bit bus to the 16-to-20-bit converter 115 that makes the channel code dc-free. At the same time, the CRC error-protection word generator 116 is also connected to the 16-bit bus. At the output of this 16-to-20-bit converter stage 115 a 20 bit bus leads on to other circuits.

A sync word generator 117 is connected to the 20-bit bus, which continues on to a level-converter stage 118 which converts the TTL level into ECL level (i.e., converts from transistor-transistor-logic to emitter-coupled logic). From this conversion stage the signal, still 20-bits wide, is led on to a parallel-to-serial converter 119, which finally at its output brings a signal to the switching location 120 where the signal is fed into the video data stream.

The master oscillator 121 delivers the clock or synchronizing pulses by which the program control 122 provides clock pulses for the control of the buffer stores 101 to 104, the RAMs 111 to 114, the address counters 131, 132, 133, and 134, and the synchronization of the converter 115. In addition the master oscillator provides the clock pulses for the analogue-to-digital converters 71 to 74, the serial-to-parallel converters 91 to 94, and the read-in pulses for the buffer stores 101 to 104. It is to be noted that the clock and synchronization connections, for reasons of simplification are shown merely by single lines. Different clock times are of consequence for each channel, so that an individual connection must be provided for each channel.

Figure 8:
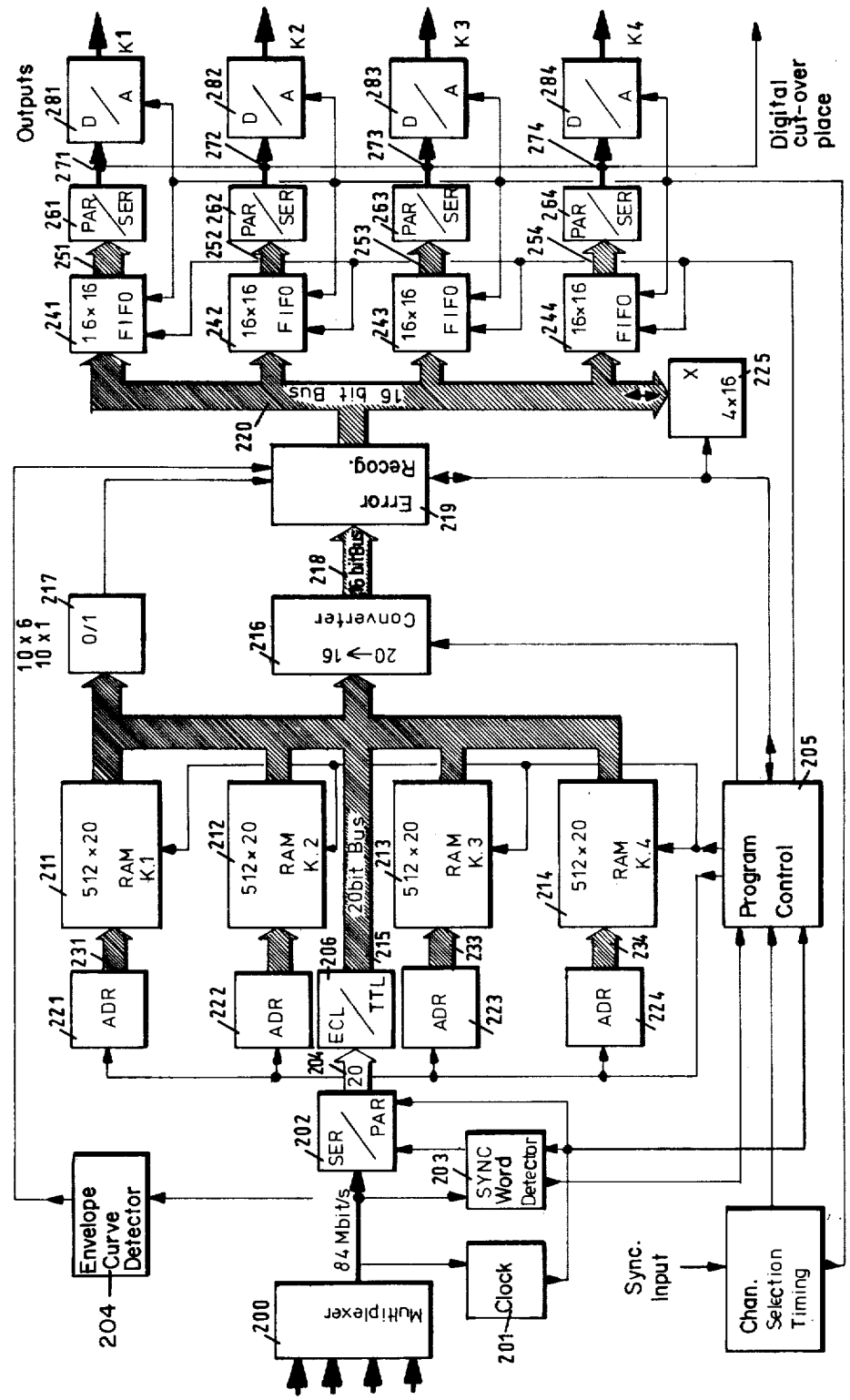
FIG. 8 is a block diagram of a circuit for reproduction of signals recorded by the apparatus in FIG. 7.

FIG. 8 shows the clock diagram for the reproduction channel. The signal comes from the video heads that serve as signal sources. The signal is led from the video heads to four pre-amplifiers (not shown). From these four pre-amplifiers the signal is provided to a multiplexer 200. This multiplexer switches the bit sequential signals coming in succession from the four heads together into a signal stream that at particular moments provides signal bursts with a data rate of 84 Mbit/s. After the multiplexer 200 the signal is supplied to a synchronization regeneration stage. At the same time the signal is supplied to a serial-to-parallel converter 202, to a sync word detector 203, and to an envelope detector 204. The sync word detector 203 recognizes when the "sound signal" begins, i.e., the sync word detector recognizes the first synchronization word for the sound block and provides a control pulse to the serial-to-parallel converter 202, opens the gate as might be said, so that digitalized information from the serial-to-parallel converter is supplied to a 20-bit bus 204. At the same time the synchronization word detector 203, upon recognition of the synchronization word, provides a pulse to the program control 205 so that the latter may begin providing clock pulses to the stores 211, 212, 213, and 214. An information word is thus simultaneously converted from serial-to-parallel and the store is clocked so that this word is read in. For this purpose the 20-bit bus from the serial-to-parallel converter 202 is brought to a ECL/TTL level converter 206. From the output of the ECL/TTL level converter a 20-bit bus 215 leads which connects to all the RAMs 211 to 214.

Since this concerns a time sequential pulse sequence, all of the RAMs can be simultaneously connected to each other, for output as well as input. The program control 205 supplies a control pulse that switches the corrsponding RAM to receiving or writing operation. At the same time the program control supplies to the corresponding address counters 221, 222, 223 and 224 of the respective RAMs a control pulse so that the address is correctly entered. The address counter is connected to the RAM by an address bus as shown at 231, 232, 233 and 234. The 20-bit bus 215 for the data information is also connected with the RAM at the same time with a 20 to 16 converter 216 and, also, with a 0/1 check stage 217.

Figure 9:
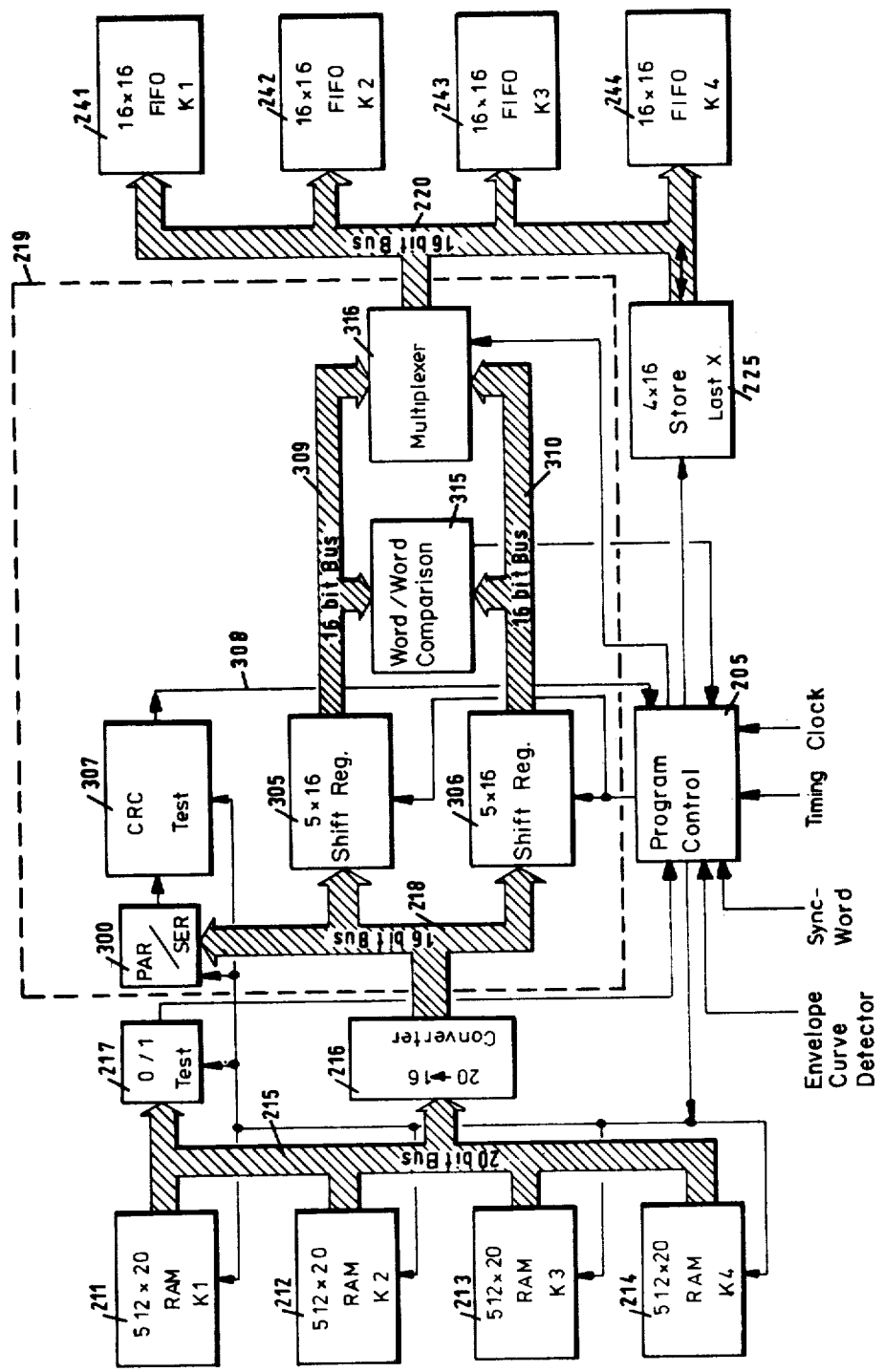
FIG. 9 is a detail of a portion of the circuit of FIG. 8.

The 0/1 checking stage 217 stores all the bits of an information word and checks whether the same number of zeros and ones are present in the word. At the output of the 20 to 16 converter a 16 bit bus 218 leads to the error-recognition stage 219. The more particular constitution of the error-recognition stage 219 is shown in FIG. 9. It receives likewise a signal from the 0/1 check stage 217. In the same way a connection is provided from the envelope curve detector 201 to the error-recognition stage 219. The output of the error-recognition stage leads to a 16-bit bus 220, which connects all the output stores 241, 242, 243 and 244 with the last-X register 225. The output stores 241, 244 are organized according to the FIFO (first in, first out) principle. From each of these FIFO output stores 24 to 244, 16-bit busses 251 to 254 lead over to the parallel to serial output converters 261 to 264 for the respective channels. Following each serial parallel to serial output converter 261 to 264 is provided a digital output cutover location 271, 272, 273 and 274. At the same time the serial signal proceeds to digital-to-analog converters 281, 282, 283 and 284 which provide analog signals at their respective outputs. The construction is the same for each channel. Just as in FIG. 7, the clock connections are highly simplified in their representation for purposes of better illustration.

FIG. 9 shows the constitution of the error-recognition stage 219 of FIG. 8 which protects against errors. The broken line rectangle 219 designates the error-recognition arrangement. The other stages are already known from the previous description of FIG. 8. The RAMs of the reproduction channel contain 512 bit X 20 storage places, hence twice as many as in the case of the recording channel because the signal for reasons of safety is twice recorded on the tape and is also twice stored when it is read out.

The output of the 512×20 RAMs 211 to 214 is a 20-bit bus 215. The RAMs 211-214 on their output side are connected with the 0/1 check stage 217 and with the 20 to 16-bit converter 2 and 6, as well as with each other. All the RAMs receive a synchronizing and a control order pulse, the latter controlling operation in recording, writing, or reading mode and, also, beginning of clocking. The address counters that belong to these operations are not shown in FIG. 9; these were, however, shown in FIG. 8 and explained.

At the output of the 20 to 16 bit converter, there is connected a 16-bit bus 218 which connects a parallel-to-serial convertor 300 to independent shift registers 305 and 306, the shift registers in each case being 5×16 bit devices. The parallel to serial converter 300 functions to convert each 16-bit signal into a serial signal. At the serial output of the parallel-to-serial converter 300 is a CRC check stage (cyclic redundancy check) 307. The signal that is present in parallel form must be converted (within the CRC stage) into serial signals because the CRC word is generated in serial operation. The information is read serially and the check word is thus generated. The check is performed exactly as in the unit 116 of FIG. 7, but in this case the check word goes by a connection 308 to program control. In this connection the CRC check 307 informs the program control whether the information received is error free. While the information is being provided through the parallel to serial converter 300 to the CRC check stage 307, the same information is provided in parallel to the 2 shift registers 305 and 306. The information can be retrieved in parallel in either case from the outputs of the shift registers 305 and 306. This is performed by two further 16-bit busses, 309 and 310, at the output of the shift registers, which supply the information in each case to a word-for-word comparator 315 and to a 16-bit multiplexer 316. The word-for-word comparator provides an input signal to the program control 205. This output signal provides an indication whether or not an error was present. The program control can then decide which word will be read out and provides a signal for that purpose to the multiplexor 316, which switches the corresponding word to the output. At the output of the multiplexer, a 16-bit bus 220 is connected which connects the output stores 241 to 244 with the last-X register 225.

Explanation of the operation in recording described as to recording channel 1 for example:

FIG. 7: The analog input signal is sampled by the analog-to-digital converter 71 through a sample-and-hold amplifier (not shown) and is then digitalized and furnished to an output, in serial form, from which the signal is provided to the cut-over point 81. This can be a switch-over network, for example, constituted by field effect transistors as is common in practice. From this point 81, the signal is supplied to a serial-to-parallel converter 91 which converts the signal into a 16-bit parallel signal that here is called a "word-serial signal" (a word contains 16 bits). The 16-bit bus from the output of serial-to-parallel converter leads to a buffer store 101 that, for example, can be of type F 3341/F 9403 or S 67401 FIFO. This buffer store accepts the signal word by word in accordance with the input clock rate of the analog-to-digital converter 71 or the output rate of the serial-to-parallel converter 91 and stores it. A FIFO is a buffer store which accepts a time-fluctuating signal and can provide it as its output at a different clock rate so that time base fluctuations can be equalized. The output rate of the buffer store 101 is set by the program control. The outputs of the buffer store are switched to a 16-bit bus that applies the signal to a 256×16 oriented RAM 111. The RAM can consist of several ordinary 256×4 RAMs which are cascaded in the usual way. For this purpose an address counter 131 is provided that is adapted to the interconnection of the RAMs. The address counter consists of the usual components. The signal is read into the RAM 111 at the clock rate of the program control 122.

The reading out of the RAM 111 is likewise controlled by the program control, but takes place for the purpose of time compression at a substantially higher clock rate than the reading in of the signal. The reading in of the signal occurs at a clock rate of 50 KHz. The reading out is performed with a clock rate of such magnitude that after the serializing of the signal, the signal is transformed to the 80 megabit level. At this point, however, an increase of the information rate of the error protection circuit is still to be taken into account. The changing of the clock rate is taken care of by the program control 122 and likewise the switching over from writing to reading operation. When the information is read out of the RAM in burst form—which proceeds very fast—the information must be buffered on the input side by the buffer stores 101-104. A readout synchronization (i.e., an entire information burst) is about 80 μs long. Within this 80 μs about 4 new information words are generated from the input analog to digital converters. These 4 information words are stored in the buffer store in each case. Since 4 four channels are unloaded sequentially, one after another, 4×4 information words are generated, so that all together 16 information words must be caught in the buffer store 101 until it can read out again. For this reason a 16×16 buffer store is provided that, of course, can also be larger.

The buffer store 101 decouples the 16-bit bus from the output of the serial to parallel converter 91 from the 16-bit bus that is connected between the buffer store 101 the RAM 101 and the 16-to-20 converter 115, i.e. the analog-to-digital conversion at the input is independent of the clock rates of the RAMs. The 16-bit bus, that leads to the 16-to-20 converter, also leads to the CRC word generator 116. The serial manner of operation of the CRC generator is taken into account by the design and constitution of the circuit. The 16-bit bus is accordingly converted into a serial 16-bit signal that is supplied to the CRC generator. Then the output signal of the CRC generator is again converted back with a serial-to-parallel converter and returned to the bus. (Converters are built into the CRC word generator stage 116.)

The 16-to-20 bit converter 115 makes a 20-bit wide information word out of the 16-bit signal, in order to fulfill the channel requirement that every word has just as many ones as zeros. At the output of the 16-to-20 bit converter 115 there is connected also a 20-bit wide bus leading to the synchronization word generator 117 and to the TTL/ECL level converter stage 118. The synchronization word generator can be constituted very simply. It can consist of several circuits that provide a particular bit combination, but it can also consist of a programmed read-only memory (PROM).

DESCRIPTION OF THE OPERATION OF THE REPRODUCTION CHANNEL (FIG. 8):

The digitalized signal comes from the multiplexer in burst form and is first supplied to the synchronization regenerating stage 201, which reconstitutes the synchronization pulses of the signal and supplies the signals to the serial-to-parallel converter 202 and then, after recognition of the synchronization word, to the ECL/TTL level converter 206. The ECL/TTL level converter sets the signal in DC level and supplies the 20-bit parallel word-serial signal to a 20-bit bus, to which all the RAMs 211 to 214 for the channels K1 to K4, as well as the 20-to-16 bit converter 216 and the 0/1 check stage 217, are connected. From the program control 205, the RAM of the channel which is already in receiving condition receives a control signal so that the RAM is switched to "write" operation. At the same time its address counter is reset to the start address. This occurs when the synchronizing word is recognized and the synchronization word detector has provided a pulse to the program control 205. Now the signal is read into the RAM at the rate that is set by the synchronization regenerating stage 201. The program control 205 clocks the address counter of the RAM in word rhythm after every 20 incoming serial bits from the serial-to-parallel converter 202 input line. Each 20-bit word is provided to the ECL/TTL level converter 206 and then to the bus and at the same time the address counter is advanced to the next word address, so that the words can be correctly fed into the RAM. This occurs very fast. A tone burst lasts about 80 microseconds, within which 80 microseconds a single RAM is filled. The information that is now in the RAM is then read out of the RAM and provided to the 20-to-16 bit converter 216 in slow steps clocked by the program control. The 20-to-16 bit converter converts each 20-bit word that it receives at its input into a 16-bit word which corresponds to the original signal sample. This 16-bit word is then connected through the 16-bit bus to the error recognition and correction stage 219 that determines by comparison whether some error is present in the signal stream and ultimately corrects it. At the same time as the conversion from 20-to-16 bits each individual word is checked on its count of zeros and ones. This is done by the 0/1 check stage 217, that again produces a signal to the error recognition stage 219. The signal is checked as it comes out of the multiplexer at the input of the circuit by the envelope curve detector 204. The envelope curve of this signal determines whether dropouts have occurred and thereby a high probability of error or whether it could either be free of errors or contain only occasional disturbances. The envelope detector 204 has the function to warn the error recognition stage of a probably high error rate, for example when very strong or long dropouts are present, so that the envelope curve detector responds. A more exact explanation of the manner of operation of this system is provided in connection with the discussion of FIG. 9.

From the output of the error recognition stage 219 a 16-bit bus leads to all the output buffer stores 241 to 244 and to the last X register 225. The last X register has the task has the function always to catch and store the last word so that in the case of an error that cannot be further corrected the signal can revert to the most recent good data word.

A 16-bit bus leads from the output of the buffer stores 241 to 244 to the parallel-to-serial converters 261 to 264 which in a known way convert the signal back into a serial data stream. From the output of each parallel-to-serial converter the signal is supplied to the digital output cutover location 271-274. The signal also goes to the digital-to-analog converters 281-284 which convert the signal back into an analog signal. The same applies to the output buffer stores as to the input buffer stores in the recording channel, namely that the FIFOs decouple the output clock rates from the internal clock rate of the logic, so that no time base fluctuations occur at the output.

From the output of the 20-to-16 bit converter (FIG. 9) the 16-bit parallel signal is supplied to the parallel-to-serial converter 300 which controls the CRC check stage 307. The CRC check stage checks in serial operation whether the transferred information is error-free, by carrying out a serial division. The output signal of the CRC can merely decided whether information is error-free by checking an entire block, as it is done in the recording, which is provided with error protection. The CRC check stage cannot determine in which information word an error is present; it makes only a determination whether an error has occurred or not. The information is therefore checked not only by the CRC, but also by a word to word parallel comparison. From the output of the 20-to-16 bit converter 216 the signal is therefore loaded into two shift registers 305 and 306. These shift registers are independent of each other and are so controlled by the program control 205 that each time the same information is read into these shift registers from the two different recording intervals. The word to word comparison makes a determination whether an error is present. If an error is found, which means that a deviation between the two words compared in parallel is found, an indication thereof is provided back to the program control. At the same time the result of the 0/1 check is compared by the program control with the result of word to word comparison and it is determined which word can be taken from the output multiplexer 316 and supplied to the output buffer store for further processing. If neither word can be regarded as error-free, the last-X store which contains the last word sample value that is still regarded as good, is brought into play by the program control. When very strong dropouts occur, the envelope curve detector recognizes them and warns the program control 205 that a dramatic increase of the error rate is to be expected. The program control takes account of the increased error rate and the evaluation of the CRC check and of the word to word comparison. Only the 0/1 check for error-checking is then utilized. It is thus assured that no double or triple errors pass for an apparently good signal.

In the conversion of the data words from the 16-bit original code into the 20-bit code (FIG. 7), only a part of the possible dc-free combinations of the 20-bit code are needed for storing all data words possible in 16-bit code. The reproduction of data words read out in 20-bit code can be checked whether these combinations at all have an original address in the frame of the possible combinations of the 16-bit code. If the original address lies outside the frame of possibility, this signifies the presence of a bit error in the data word that has been read out.

Although the invention has been described with reference to particular illustrative examples, it will be understood that variations and modifications are possible within the inventive concept.

We claim:

1. Method of recording and reproducing television signals on a magnetic tape, by means of a plurality of rotary heads successively sweeping said tape while the tape is advanced so as to record said signal on tracks disposed obliquely on the tape, at a rotary speed such that the recording of a picture frame requires a nonintegral number of revolutions of said rotary heads, wherein the television signals comprise video information for each picture frame in the form of two picture fields for interlaced presentation, and in which method audio information relating to the video information is provided in a plurality of independently usable channels and is recorded after buffer storage with time compression in blocks inserted blockwise in respective similarly located sections of various of said obliquely disposed tracks relating to each picture frame, each block being individual to one of said channels and the sequence of blocks serving said channels in turn in repeating sequence, and comprising the improvement which consists in that:

the readout rate of the audio information from said buffer storage for recording of the information is made such that an integral number of complete channel blocks sequences is used for recording audio information in the period of each television picture field; and the recording of said channel-sequential blocks of audio information in respective similarly located sections of successive oblique tracks is skipped for at least one track per picture field.

2. Method as defined in claim 1, wherein the television signals comprise video information for each picture frame in the form of two picture fields for interlaced presentation, and wherein said readout rate of the audio information is made such that an integral number of complete channel block sequences is used for recording audio information in the period of each picture field and the recording of said channel-sequential blocks of audio information in respective similarly located sections of successive oblique tracks is skipped for at least one track per picture field.

3. Method as defined in claim 2 in which the recording of said channel-sequential blocks of audio information is skipped for just one oblique track per picture field.

4. Method as defined in claim 2 in which a portion of tape occupied by the recording of video information of any picture frame occupies the same length of tape on which are recorded channel sequential block of audio information relating to said picture field.

5. Method as defined in claim 1 in which a portion of tape occuppied by the recording of video information of any picture frame occupies the same length of tape on which are recorded channel sequential blocks of audio information relating to said picture frame.

6. A method as defined in any one of claims 1-5, in which the skipped oblique track section in which none of said audio information is recorded, which section corresponds in location to the track sections in which said channel sequential blocks of audio information are located on other tracks, is utilized for the recording of supplemental information.

7. A method as defined in any one of claims 1-5, in which the same audio information is recorded in duplicate channels and in which a synchronization word is recorded at the beginning of each recorded block of audio information of said duplicate channels for the purpose of enabling word to word comparison of reproduction of said duplicate channels for error detection in reproduction of the recorded television signals.

8. A method according to claim 7 which is followed later by reproduction of the recording signals, in which, with the use of said synchronization words recorded in said duplicate channels for address framing, digitally encoded data words of said audio information of corresponding addresses are checked for identity for purposes of error detection and correction.

9. A method as defined in any one of claims 1–5, in which said audio information is digitally encoded into data words in words of a first bit length which are not constrained to be dc-free, which are then converted into words of a second bit length greater than said first bit length, which words are dc-free, and then recorded in dc-free code.

10. A method according to claim 9 which is followed later by reproduction of the recorded signals, in which the dc-free data words of said audio signals are checked with respect to the consistency of their original addresses in a code of said first bit length.

11. A method as defined in claim 9, in which said video information data words of said first bit length are provided to a cyclic redundancy check word generator for the provision of checing information in the data stream before conversion of said words of said first bit length into words of said bit length.

12. A method as defined in claim 9, in which said first bit length is 16 bits and said second bit length is 20 bits and in which the 20-bit words are evaluated for recognition of the correct original address of the data word in the channel block within a prescribed address value region.

13. Apparatus for recording television signals with an integral number of sequences of audio channel data blocks, relating to a plurality of channels of which blocks are recorded in a repeating sequence, interspersed in the recording of video channel signals of each picture frame, all on the same magnetic tape, said apparatus comprising:
- a plurality of analog-to-digital converters (71–74), each having its input connected to a source of audio signals of one of said channels;
- a plurality of series-to-parallel converters (91–94) for converting the respective outputs of said analog-to-digital converters from sequential bits to parallel-transmitted words of a first number of bits;
- a plurality of FIFO buffer stores (101–104) and program control means (122) for storing the respective outputs of said series-to-parallel converters at their respective output rates and for delivering said outputs under program control for further processing;
- a plurality of random access memories (111–114) connected, subject to said program control means (122), by a common data bus to each other and to the outputs of said FIFO buffer stores for storing blocks of said words of said first bit length in an address sequence directed by said program control means (122);
- a clock signal source (121) and means for synchronizing the signals thereof by synchronizing signals of the television signals to be recorded, for clocking the operation of said analog-to-digital converters, series-to-parallel converters and FIFO buffer stores at a first clock rate;
- a frequency divider (123) connected to an output of said first clock signal source for providing a second clock signal source for providing a second clock frequency to said analog-to-digital converters; and
- means (115, 118, 119, 120) connected to and responsive to said common bus and subject to said program control means (122) for providing blocks of digitalized audio information to magnetic heads for recording on said tape in interspersed relation to concurrently recorded video signals of each television picture frame in an integral number of audio channel block sequences of which each block is individual to one audio channel, in a manner in which channel blocks succeed each other at regular intervals except for skipping at last one interval in every picture frame interval.

14. Apparatus as defined in claim 13, in which cyclic redundancy check means (116) are connected to said common data bus for the generation and insertion of CRC check words in the data furnished to said means (115, 118, 119, 120) for providing blocks of digitalized audio information for recording on said tape.

15. Apparatus as defined in claim 13, in which said means for providing blocks of digitalized audio information for recording on said tape include a code conversion stage (115) for converting data words received from said common bus in a dc-free code into words of a second code which is not constrained to be dc-free and is capable of transmitting the same data at a somewhat slower bit rate.

16. Apparatus as defined in claim 15, in which said means for providing blocks of digitalized audio signals include means (117) for generating at least one synchronizion word said dc-free code for each channel block of audio data provided by the output of said code conversion means.

17. Apparatus as defined in claim 16, in which said means for providing blocks of digitalized audio information for recording on said tape includes conversion means (118, 119) responsive to the dc-free data words provided by the output of said code converter (115) for conversion thereof into a serial data stream for recording.

18. Apparatus as defined in claim 13, in which said program control means (122) include means for clocking the output of said FIFO buffer stores and the operation of said random access memories independently of the timing and rate of clocking at the input of said FIFO buffer store by said clock signal source (121) and also include means for clocking the operation of any other apparatus connected to said common data as well as means for clocking the various components of said means for providing blocks of digitalized audio information to magnetic heads for recording on said tape.

19. Apparatus for reproducing television signals recorded on a tape with an integral number of sequences of audio channel data blocks relating to a plurality of channels of which blocks are recorded in a repeating sequence, interspersed in the recording of video channel siganls of each picture frame, said apparatus comprising:
- multiplexer means (200) having inputs for signals received from the respective magnetic heads of a tape-scanning headwheel and combining said signals into a single data stream supplied at the output of said multiplexer means;
- a synchronizing signal regenerator (201), and a synchronization word detector (203) having their inputs connected to said output of said multiplexer means;
- means (202), having inputs connected to said multiplexer means, synchronizing signal regenerator and synchronization word detector (203), for converting said output of said multiplexer into a sequence of multibit words in dc-free code, of which the bits of each word are transmitted in parallel;

means (211-214) for storing said multibit words by channel blocks in a plurality and on access memories connected by a common data bus;

code converter means (216) for converting said dc-free data words into words of a shorter bit length in a code that is not constrained to be dc-free, provided to a second data bus, whereby a reduced bit rate of transmission is made possible;

program control means (205) for controlling the storing of said words in said memories and controlling said code converter;

error recognition means (219) interposed between the output of said code converter and said second data bus for prevention of transferring to said second bus of at least some data words that are recognized as containing errors;

a plurality of FIFO buffer stores (241-244) for collecting the data words of blocks of data relating to the respective audio channels said program control means being connected to said buffer stores for collecting said data words therein as aforesaid;

a plurality of parallel-to-serial converters (261-264) for converting the respective outputs of said FIFO buffer stores into serial data streams; and a plurality of digital-to-analog converters (281-284) for converting the respective outputs of said parallel serial converters to analog signals respectively furnished for output audio channels.

20. Apparatus as defined in claim 19, in which said random access memories (211-214) are provided with addressing means (221-224) under control of said program control means (205) for storing the channel blocks of data blockwise in the respective random access memories and for reading them out for distribution to said FIFO buffer stores at a less irregular time rate in each channel.

21. Apparatus as defined in claim 19, in which an envelope detector circuit (204) connected to the output of said multiplexer is provided for recognition of amplitude error in the serial data stream picked up from the tape and for furnishing indication of such amplitude errors to said error-recognition means (219).

22. Apparatus as defined in claim 19, in which there are interposed, between said common data bus and said error detection means (219), means for checking the equality of the number of ones and zeros of said data words encoded in said dc-free code and providing an indication of the results to said error-recognition means (219).

23. Apparatus as defined in claim 19, in which means (225) are connected to said data bus for currently storing data information on said bus and for providing the last stored data in the event of a brief data dropout.

* * * * *